United States Patent
Melzer et al.

(10) Patent No.: US 6,669,813 B1
(45) Date of Patent: Dec. 30, 2003

(54) DEVICE FOR LAMINATING A LAYERED STRUCTURE CONSISTING OF AT LEAST TWO PLASTIC STRIPS IN SECTIONS

(75) Inventors: Rainer Melzer, Schwelm (DE); Roland Melzer, Schwelm (DE)

(73) Assignee: Melzer Maschinenbau GmbH, Schwelm (DE)

( * ) Notice: Subject to any disclaimer, the term of this patent is extended or adjusted under 35 U.S.C. 154(b) by 15 days.

(21) Appl. No.: 10/070,858

(22) PCT Filed: Sep. 15, 2000

(86) PCT No.: PCT/DE00/03213

§ 371 (c)(1),
(2), (4) Date: May 28, 2002

(87) PCT Pub. No.: WO01/21401

PCT Pub. Date: Mar. 29, 2001

(30) Foreign Application Priority Data

Sep. 17, 1999 (DE) .......................... 199 44 769
Sep. 30, 1999 (DE) .......................... 199 46 928
Oct. 20, 1999 (DE) .......................... 199 50 474

(51) Int. Cl.[7] .................................. B30B 5/06
(52) U.S. Cl. .................. 156/583.5; 156/358; 156/359; 156/366; 156/498; 156/555
(58) Field of Search .................. 156/351, 358, 359, 366, 498, 555, 580, 582, 583.1, 583.5

(56) References Cited

U.S. PATENT DOCUMENTS 3,948,718 A  4/1976 Mosburger .................. 156/543
4,863,546 A  9/1989 Melzer et al. .............. 156/308.2
6,019,268 A * 2/2000 Melzer et al. .................. 226/35
6,139,664 A * 10/2000 Melzer et al. ............... 156/73.1

FOREIGN PATENT DOCUMENTS

| DE | 3413053 | 1/1985 |
| DE | 4205746 | 3/1993 |
| EP | 0 134 820 | 3/1985 |
| FR | 2.219.841 | 9/1974 |

OTHER PUBLICATIONS

Abstract for German Patent No. DE4205746.
Abstract for German Patent No. DE3413053.

\* cited by examiner

*Primary Examiner*—James Sells
(74) *Attorney, Agent, or Firm*—Nikolai & Mersereau; C. G. Mersereau

(57) ABSTRACT

The invention relates to a device for laminating a layered structure (1), consisting of at least two plastic strips in sections, comprising successive panels with designs, for producing plastic cards along a conveyor path. Said device comprises heating and cooling devices (8, 9, 10, 11) which are positioned one behind the other and consist of individual compression elements, located on a common support (14), whose temperature can be controlled and which accommodate a whole number of panels and a drive unit which displaces opposing compression belts (2, 3) which can be driven intermittently in a direction of transport and between which the plastic strips can be displaced in sections through the heating and cooling devices. The aim of the invention is to provide a device which permits the production of plastic cards with a higher laminate quality. To this end, the compression elements are mounted so that they can be displaced in the direction of the conveyor path against a restoring force which acts upon their initial position.

19 Claims, 3 Drawing Sheets

DEVICE FOR LAMINATING A LAYERED STRUCTURE CONSISTING OF AT LEAST TWO PLASTIC STRIPS IN SECTIONS

BACKGROUND OF THE INVENTION

The present application is a 371 National Stage of co-pending application PCT/DE00/03213 having an international filing date of Sep. 15, 2000, and a priority date of Sep. 17, 1999, entitled "Device for Laminating A Layered Structure Consisting of At Least Two Plastic Strips in Sections".

1. Field of the Invention

The invention relates to a device according to the pre-characterizing clause of claim 1 for laminating in sections a layered structure consisting of at least two plastic strips, comprising successively formed panels with designs, for producing plastic cards along a conveying path, comprising successively arranged heating and cooling devices, which are formed by individual temperature-controllable pressing elements which accommodate an integer number of panels and are arranged on a common support, and a drive unit, which displaces mutually facing pressing bands which can be driven intermittently in a conveying direction and between which the plastic strips can be moved in sections through the heating and cooling devices.

2. Related Art

EP-B-0 134 820 describes a device which, for a continuous production of plastic cards, in particular credit cards, check cards, access cards etc., allows a synchronous feed of plastic strips into a laminating installation for the forming of a laminate. The plastic strips consist of individual panels which are separate from one another and are arranged one behind the other in one or more rows. The laminating installation comprises heating and cooling devices made up of temperature-controllable pressing elements which are arranged on a longitudinal support and the dimensions of which are chosen for the treatment of an integer number of panels at a time and allow baking in sections of the plastic strips forming a layered structure, with subsequent cooling. By arrangement between mutually facing endless pressing bands which can be driven in a cyclical manner, the at least two plastic strips are moved into treatment zones for the pressing elements, in which the heating-pressure effect and the cooling-pressure effect is transferred to the plastic strips. The plastic strips are laminated in sections as a result. For this purpose, the pressing elements respectively comprise a fixed lower pressing bar and a movable upper pressing bar, between which the pressing bands come into contact during the heating/cooling-pressure treatment.

However, it has been found to be disadvantageous that, in rapid treatment, the temperature-controlled web with high temperatures of the plastic strips to be laminated lead to high local instances of expansion and shrinkage of the pressing bands and possibly of the plastic strips, to be precise in particular in the edge region of the pressing zones, where discontinuous temperature and pressure conditions prevail. This leads to high loading with compressive and tensile forces and possibly to damage of the pressing bands, so that they are subject to a high degree of wear. If, to increase the rate of production, the shortest dwell times are used for heat treatment, but, to compensate for this, high temperatures, this disadvantageous wear increases. Furthermore, laminating defects occur at the panels and lead to an undesired rejection rate, since there is a high requirement for the surface of such plastic cards to be defect-free.

DE-C-42 05 746 describes a device for adhesively bonding sheet-like workpieces, in particular for concealing plastic parts in sheet form, in which a depositing station, a heating station, a pressing station and a cooling station, arranged outside the pressing station, are successively arranged. The workpieces to be adhesively bonded are passed individually in succession by means of a lower transporting belt first through the heating station and subsequently through a pair of pressing rolls of the pressing station. The pressing station, defined by the pair of pressing rolls, serves at the same time as a deflecting roller for transporting belts and is not movable with respect to the conveying path. The heating station comprises two heating plate units, which respectively has a link chain comprising a plurality of chain links, on which there are mounted transverse supports, which run transversely with respect to the conveying direction and have heating elements. The links of the link chain are respectively connected via intermediate links on both sides to a drive cylinder, via a driving shaft, by the actuation of which cylinder the two link chains of the heating plate units can be configured such that they are parallel to each other, bulging out substantially in the same direction or else converging in a wedge-shaped manner. Although the link chains of the heating plate unit are adjustable, this adjustment does not permit a movable arrangement of the heating elements, or even of the pressing station, nor the movement in the direction of the conveying path, on account of the static adequately determined fixed position of the drive cylinders. A cooling press is not provided. The position of the chain links is static.

It is the object of the invention to provide a device which allows the production of plastic cards with high laminating quality at high rates of production.

SUMMARY OF THE INVENTION

This object is achieved according to the invention by burning a device for laminating the layered structure consisting of at least two plastic strips in sections including successively formed panels with designs for producing plastic cards along a conveying path. The device includes successively arranged heating devices and cooling devices, which are formed by individual temperature-controllable pressing elements, wherein each pressing element accommodates an integer number of panels, and wherein the pressing elements are arranged on a common support. A drive unit is provided which displaces mutually facing pressing bands, wherein the pressing bands can be driven intermittently in a conveying direction, and wherein plastic strips can be moved in sections between the pressing bands through the heating and cooling devices. The pressing elements are arranged such that they can be moved in the direction of the conveying path against a restoring force, which acts toward their initial position.

This provides a device for laminating in sections a layered structure consisting of at least two plastic strips, comprising successively formed panels with designs, for producing plastic cards along a conveying path, which device transfers the temperature-induced local changes in length of the pressing bands to the positioning of the pressing elements, by the latter being able to follow axial displacements and thereby permit a compensation to take place. Undesired loads of the pressing bands and of the plastic strips in the longitudinal direction are avoided as a result. Consequently, operation even with short cycle times and resultant high temperatures is possible without any defects occurring.

It is advantageous in this case that, by incorporating in the design a dissipation of the axial distortion forces occurring, the device responds directly, so that it is possible to dispense with complex controllers for this purpose.

The device according to the invention advantageously decouples adjacent pressing elements, so that the pressing elements can have a slight change in their distance from each other in the conveying direction. This makes it possible for the cyclically or intermittently driven pressing bands and the plastic strips lying in contact with them, which are exposed to locally different temperatures on account of the differently temperature-controlled pressing elements, to be positioned precisely in the pressing elements. The stresses otherwise acting on the pressing bands or plastic strips are greatly reduced as a result.

In an advantageous configuration of the invention it is provided that, during a stop in production, a raising device, raising the upper pressing bar, can be actuated for further opening of the pressing elements, the opening movement of the upper pressing bar being small in normal operation, to permit the advancement of the pressing bands. Also provided is a lifting device, which, in the event of a stop in production, raises the pressing bands simultaneously, in order to interrupt a contact bridge between the pressing bands and the lower pressing bar during the opening of the pressing element. As this happens, the pressing bands are displaced into an approximately centrally arranged position between the lower and upper pressing bars. Undesired overheating of the pressing bands is avoided as a result, since the pressing bands then only serve as heat-transferring means during the heating-pressure treatment itself. This significantly increases the service lives of the pressing bands. In particular in the case of a fault or maintenance, overheating of the plastic strips, which would otherwise result in extensive setting-up work, is effectively prevented.

The pressing bands are expediently placed in each case over a running-in drum, arranged outside the pressing elements, and a running-out drum. At least one of the drums has a peripheral portion with precision spikes, which is in drive connection with a transporting perforation provided in an edge zone of an assigned pressing band. The spiked portion permits exact registration and slip-free guidance of the pressing band. The height of the spikes is about 0.5 mm.

The spikes have an upwardly rounded form. Each of the drums is preferably provided with a spiked portion, the running-in drums and the running-out drums being offset in relation to one another to avoid the spikes hitting one another. The offset of the drums in the running-in region and in the running-out region is preferably identical and in the same direction, so that an identical band can be used for both pressing bands.

BRIEF DESCRIPTION OF THE DRAWINGS

Further advantages and features of the invention emerge from the following description and from the dependent claims.

The invention is explained in more detail below with reference to the attached drawings on the basis of preferred exemplary embodiments.

DETAILED DESCRIPTION

Figure 1:
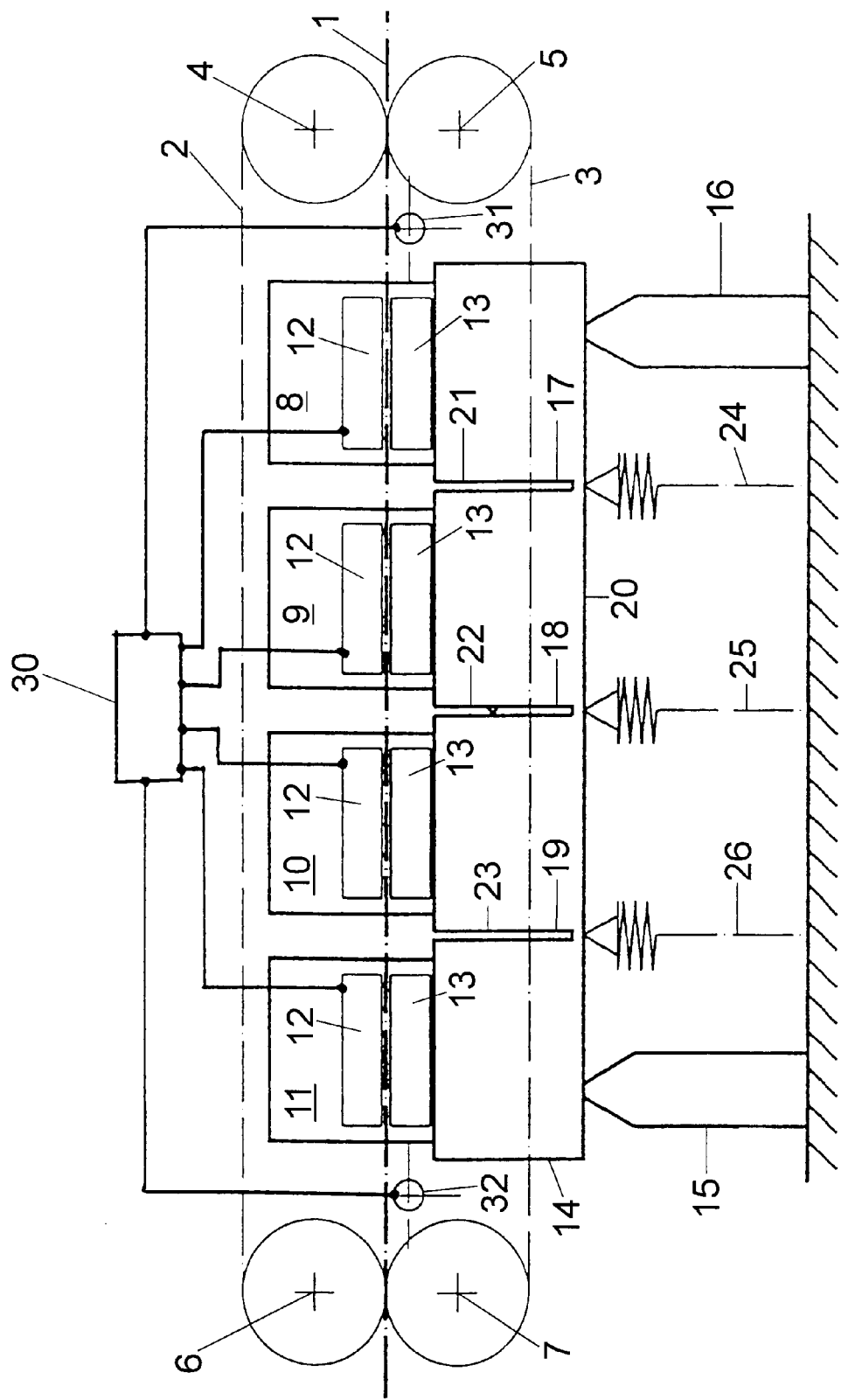
FIG. 1 schematically shows a side view of a first exemplary embodiment of a device according to the invention for laminating in sections, as a substation of a complete installation for the production of plastic cards.

FIG. 1 shows a device for laminating in sections a layered structure 1 consisting of at least two plastic strips, comprising successively formed panels with designs, as a substation of an installation for producing plastic cards along a conveying path. The plastic strips forming the layered structure 1 are synchronously fed in, the various plastic strips to be laminated to form a laminate having previously run through different processing stations, in which the panels may have been provided with synchronization holes and with printed images, information carriers, punched perforations, etc., to prepare the plastic cards to be produced for the respectively intended purpose. The average thickness of the plastic strips to be processed preferably lies around 0.1 to 3 mm, depending on how many plastic strips form a layered structure 1. The total thickness of the finished plastic cards usually lies in the range around 0.8 mm. Four plastic strips are preferably brought together to form a layered structure 1, to be precise a transparent film strip on the upper side and underside and two middle printed insert strips.

Once the at least two plastic strips have been brought together, they form the layered structure 1, which runs into a nip between two pressing bands 2, 3. The pressing bands 2, 3 are formed by two uninterrupted, mutually facing endless bands, which are respectively placed over a running-in drum 4, 5 and a running-out drum 6, 7. At least one of the bands, for example the lower band, is driven in steps and, during its circulating movement, takes with it the layered structure 1 and the other band, if the latter is not driven synchronously with it. In their outer edges, the pressing bands 2, 3 have a continuous transporting perforation, which respectively meshes with a spiked portion of the four drums 4, 5, 6, 7 and establishes an unequivocal, relatively unchangeable position. In order that the pressing bands 2, 3 operate as slip-free carriers for the layered structure 1, devices for in-register transport in the conveying direction are provided. Devices of this type are in the present case pins which are provided on at least one pressing band and engage in aligned register holes of the layered structure 1 and of the other pressing band. Alternatively, adhesively attaching devices can also be used. This establishes the position of the layered structure 1 between the pressing bands 2, 3. Driving of the pressing band provided with the pins and the transport perforation leads to precise positions of the layered structure 1 in heating devices and cooling devices described below. As a result, the surface of the pressing bands 2, 3 facing the layered structure embosses the surface of the layered structure.

Successively arranged along the pressing bands 2, 3 are heating devices 8, 9 and cooling devices 10, 11, which are formed by individual temperature-controllable pressing elements. The number of heating devices 8, 9 and cooling devices 10, 11 arranged next to one another is selectable. The heating devices 8, 9 and the cooling devices 10, 11 are respectively arranged such that they are spaced apart from one another, their spacing following the spacing of the panels of the layered structure 1, in order that the heating and cooling devices 8, 9, 10, 11 respectively act on an integer number of panels.

The heating devices 8, 9 and cooling devices 10, 11 are designed as pressing elements, with in each case an upper pressing bar 12 and a lower pressing bar 13. Between the upper pressing bar 12 and the lower pressing bar 13 of a number of pressing elements, the layered structure 1 runs through, guided between the two pressing bands 2, 3, in a conveying direction which runs from right to left in FIGS. 1 and 2. The pressing elements designed as heating devices 8, 9 are heatable electrically or by means of a temperature-controllable fluid, while the pressing elements designed as cooling devices 10, 11 are preferably water-cooled. It is alternatively possible to provide each of the heating devices 8, 9 and cooling devices 10, 11 with a dedicated upper and lower die.

FIG. 1 shows the respective pair of pressing bars 12, 13 in a closed position of the pressing elements for a temperature-controlled pressure treatment of the layered structure 1, at least the upper pressing bar 12 being movable in the manner of a die, in order to exert a compressive force on the lower pressing bar 13. After completion of a temperature-controlled pressure treatment, the pressing elements are opened, by slightly raising the respectively upper pressing bar 12, and the pressing bands 2, 3 with the layered structure 1 treated in sections are advanced in the conveying direction, for example the section of the layered structure 1 treated in the heating devices 8, 9 is moved into the region of the cooling devices 10, 11.

Figure 2:
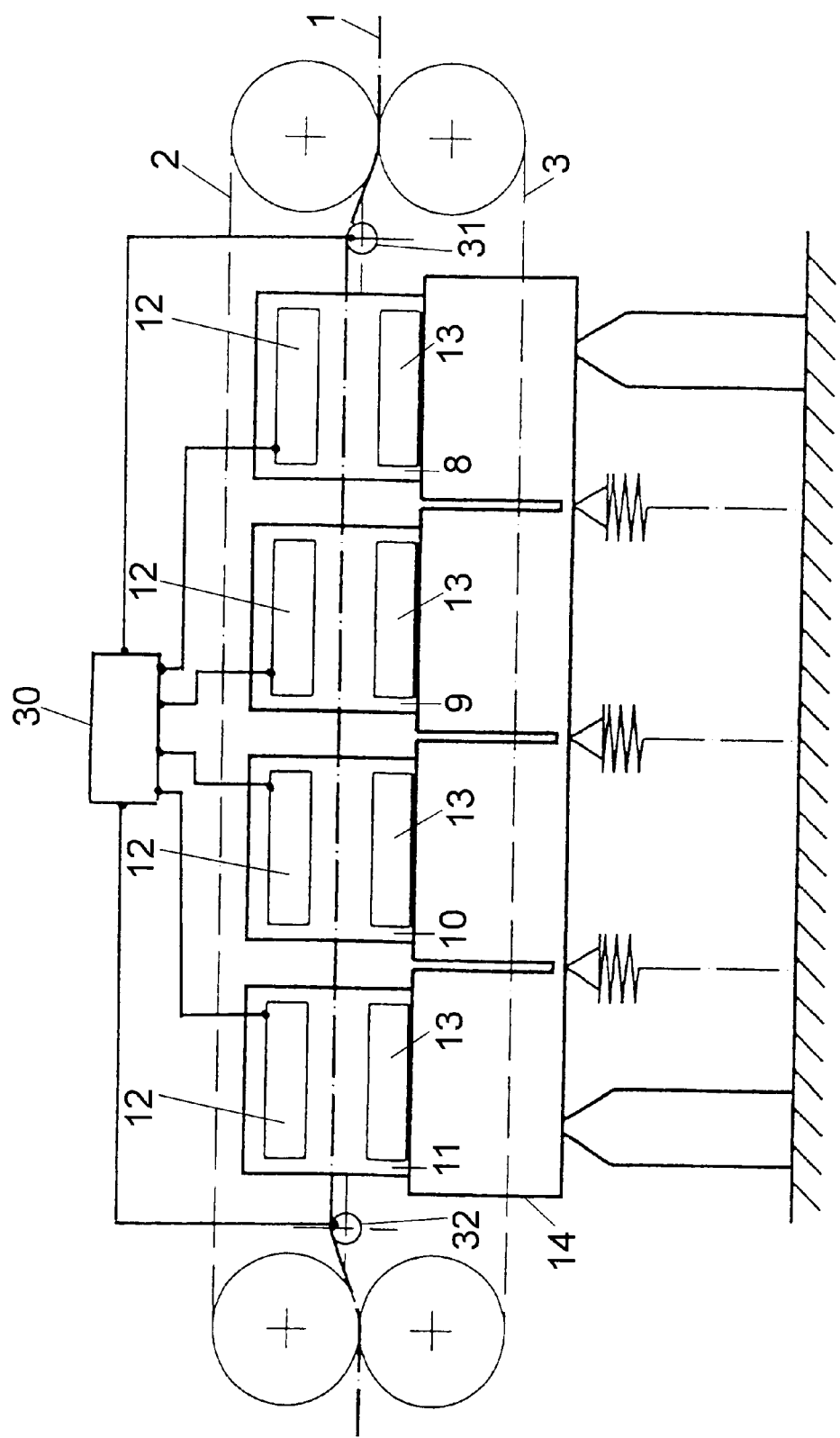
FIG. 2 schematically shows a side view of the device from FIG. 1, with raised upper pressing bar.

In normal operation, the upper pressing bar is raised by a small amount, the pressing bands are displaced, and the upper pressing bar is lowered again, in order to transfer the temperature. In the event of a stop in production, the wide opening of the upper pressing bar 12 is detected by a control device 13, in particular initiated and determined by the latter, which actuates a lifting device 31, 32, in order to raise the pressing bands 2, 3, which come into contact between the pressing bars 12, 13, from the lower pressing bars 13 when the pressing elements open wide. The lifting device 31, 32 is formed here by lifters which are arranged on the inlet and outlet sides of the heating and cooling devices 8, 9, 10, 11 and can be moved upward as compared with a disengaged position with respect to the pressing bands 2, 3, with a vertical component, as represented in FIG. 2. As a result, the pressing bands 2, 3, extending between the pressing bars 12, 13 of the pressing elements, are brought definitely out of contact with the lower pressing bars 13, and preferably into a raised midway position between the two pressing bars, along the treatment zone defined by the heating and cooling devices, when the upper pressing bar 12 opens wide or has opened wide. The distance of the pressing bands 2, 3 from the lower and/or the upper pressing bar 13, 12 is preferably between 1 cm and 35 cm.

As an alternative to the lifters represented in FIGS. 1 and 2, other lifting devices, for example a compressed-air actuator, may be provided.

The individual pressing elements are individually adjustable with regard to their temperature and the pressure exerted by them, the layered structure 1 remaining between the presses for the heating-up and cooling-down process. The temperature and pressure are chosen such that the baked and cooled layered structure 1 forms a stable laminate. For a stepped advancement of the layered structure 1, the presses are in each case opened slightly. Then, the section of the layered structure 1 which has been treated by the heating devices 8, 9 is moved with a cyclical advancement into the treatment region of the cooling devices 10, 11, so that the layered structure 1 preferably runs in sections through a heating-up process and a cooling-down process. The duration of the heating-up and cooling-down processes determines the cycle times.

The heating devices 8, 9 and cooling devices 10, 11 are arranged on a common support 14, which sets up the individual pressing elements of the heating devices 8, 9 and of the cooling devices 10, 11 such that they can be displaced axially against a restoring force. The lower pressing bars 13 are arranged on the support 14.

According to FIG. 1, the support 14 is designed as a straight longitudinal support, which is supported at both ends by bearings 15, 16 and has predetermined bending points 17, 18, 19 between respective pairs of successive pressing elements of the heating and cooling devices 8, 9, 10, 11. The predetermined bending points 17, 18, 19, which allow local sagging or upward bending of the support 14, are formed by slits 21, 22, 23, which extend in the direction of a supporting surface 20 of the longitudinal support and beneath which the support 14 rests resiliently on bearings 24, 25, 26. The slits 21, 22, 23 cut partly through the support 14, transversely with respect to the longitudinal axis, the slit length in the direction of the supporting surface 20 determining the degree of bending. What is important here is that the predetermined bending points 17, 18, 19 respectively lie between the individual heating and cooling devices 8, 9, 10, 11, transversely with respect to the longitudinal axis, to be precise as centrally as possible between them, to be able to follow instances of expansion and shrinkage of the pressing bands 2, 3, whereby the latter are relieved.

The structural design described above allows a shrinkage or expansion of the pressing bands 2, 3, and possibly of the layered structure 1, that is induced by a temperature change and occurs in the region between two heating and cooling devices 8, 9, 10, 11, to bring about a local upward bending or sagging of the support 14 in this assigned region, whereby the distance between the pairs of heating and cooling devices 8, 9, 10, 11 is increased or reduced. This load builds up a restoring force, which follows from the residual rigidity of the support 14 left by the slits 21, 22, 23 and from the resilient bearings 24, 25, 26. The design-imparted compensation for a temporary upward bending or sagging caused by the pressing bands 2, 3 can be carried out individually, i.e. the various predetermined bending points can be subjected to different loading.

Figure 3:
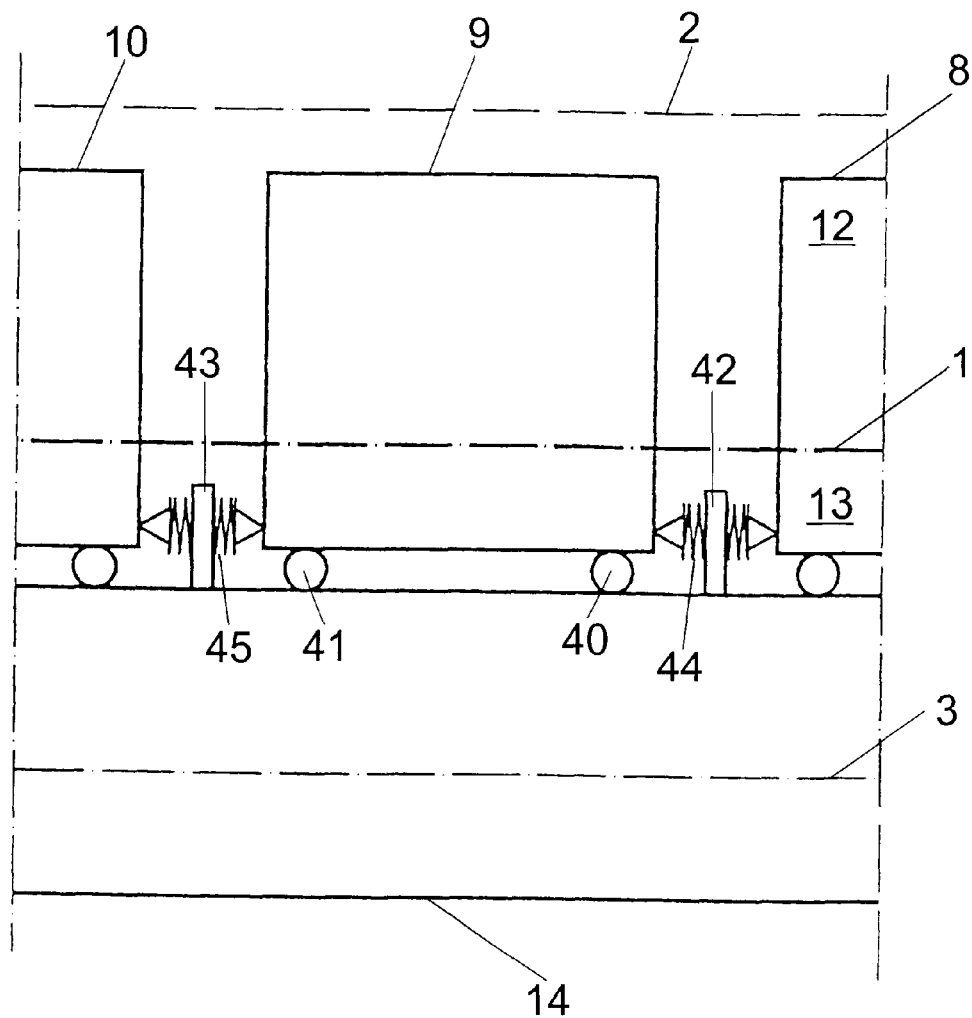
FIG. 3 schematically shows a partial side view of a second exemplary embodiment of a device according to the invention for laminating in sections, as a substation of a complete installation for the production of plastic cards.

FIG. 3 shows a second exemplary embodiment of a device for laminating in sections a layered structure 1 consisting of at least two plastic strips, comprising successively formed panels with designs, for producing plastic cards along a conveying path, which differs from the first exemplary embodiment described above in that, for the axial displaceability of the individual pressing elements in relation to one another, against a restoring force, the successive pressing elements of the heating and cooling devices 8, 9, 10, 11 are arranged in relation to one another such that they can be displaced axially with respect to the longitudinal support 14 by means of roller mountings 40, 41. In this case, the pressing elements are supported in the conveying direction respectively between two stops 42, 43, limiting the axial displaceability, on said stops by means of springs 44, 45.

The structural design described above allows a shrinkage or expansion of the pressing bands 2, 3 arriving in the heating devices 8, 9 and cooling devices 10, 11, that is induced by a temperature change and occurs in the region between two heating and cooling devices 8, 9, 10, 11, to bring about a local axial displacement of a pressing element of a heating or cooling device. The adjustable spring forces re-establish the state of equilibrium, in which the respective pressing element assumes a basic position.

What is claimed is:

1. A device for laminating in sections a layered structure consisting of at least two plastic strips comprising successively formed panels with designs for producing plastic cards along a conveying path, comprising successively arranged heating devices and cooling devices, which are formed by individual temperature-controllable pressing elements, wherein each pressing element accommodates an integer number of panels, and wherein the pressing elements are arranged on a common support, and a drive unit, which displaces mutually facing pressing bands, wherein the pressing bands can be driven intermittently in a conveying direction, wherein plastic strips can be moved in sections between the pressing bands through the heating and cooling devices, wherein the pressing elements are arranged such that they can be moved in the direction of the conveying path against a restoring force which acts toward their initial position.

2. The device as claimed in claim 1 wherein the successive pressing elements are arranged on a straight longitudinal support, wherein the support is supported at both ends and has predetermined bending points between respective pairs of successive pressing elements.

3. The device as claimed in claim 2 wherein the predetermined bending points are formed by slits which extend in the direction of a supporting surface of the longitudinal support and beneath which the longitudinal support resiliently rests such that sagging or upward bending of the support is achieved.

4. The device as claimed in claim 3 wherein the slits go through the longitudinal support transversely with respect to the conveying path.

5. The device as claimed in claim 1 wherein the successive pressing elements are arranged in relation to one another such that they can be displaced axially with respect to the longitudinal support by means of roller mountings.

6. The device as claimed in claim 5 wherein the pressing elements are arranged in the conveying direction respectively between two springs supported on stops limiting the axial displaceability.

7. The device as claimed in claim 1 wherein one of the pressing bands comprises positioning pins which engage in register openings of the plastic strips and of the other of the pressing bands for a positionally exact guidance of the plastic strips in a laminar structure through the pressing elements.

8. The device as claimed in claim 1 wherein temperature, pressure and processing time of the heatable pressing elements are adjustable by means of a control unit.

9. The device as claimed in claim 8 wherein a processing time of the coolable pressing elements is adjustable in dependence on the processing time of the heatable pressing elements by means of the control unit.

10. The device as claimed claim 1 wherein a fixed lower pressing bar and a movable upper pressing bar are provided, and wherein a lifting device raising the pressing bands with respect to the lower pressing bar is provided that is capable to be actuated by a control device detecting an opening of the upper pressing bar.

11. The device as claimed in claim 10 wherein the lifting device comprises movable lifters which are arranged on an inlet side and on an outlet side of the heating and cooling devices.

12. The device as claimed in claim 1 wherein the pressing bands are respectively placed over a running-in drum and a running-out drum, wherein the running-in drum and the running-out drum are arranged outside the pressing elements, and wherein at least one of the drums has a peripheral portion with precision spikes which is in drive connection with a transporting perforation provided in an edge zone of an assigned pressing band.

13. The device as claimed in claim 12 wherein the drums of at least one of the pairs of running-in drum and running-out drum are arranged offset in relation to one another in the conveying direction and have a peripheral portion with precision spikes.

14. A device for laminating in sections a layered structure consisting of at least two plastic strips, comprising successively formed panels with designs, for producing plastic cards along a conveying path, comprising successively arranged heating devices and cooling devices, which are formed by individual temperature-controllable pressing elements, wherein each pressing element accommodates an integer number of panels, and wherein the pressing elements are arranged on a common support, wherein the support comprises a fixed lower pressing bar and a movable upper pressing bar, and mutually facing pressing bands which can be driven intermittently in a conveying direction, by means of which the plastic strips arranged between the pressing bands can be moved in sections through the heating and cooling devices, and a lifting device for raising the pressing bands with respect to the lower pressing bar, wherein the lifting device can be actuated by a control device detecting an opening of the upper pressing bar.

15. The device as claimed in claim 14 wherein the lifting device comprises movable lifters which are arranged on an inlet side and on an outlet side of the heating and cooling devices.

16. The device as claimed in claim 14 wherein the pressing bands are respectively placed over a running-in drum and a running-out drum, wherein the running-in drum and the running-out drum are arranged outside the pressing elements, and wherein at least one of the drums has a peripheral portion with precision spikes which is in drive connection with a transporting perforation provided in an edge zone of an assigned pressing band.

17. The device as claimed in claim 14 wherein one of the pressing bands comprises positioning pins which engage in register openings of the plastic strips and of the other of the pressing bands for a positionally exact guidance of the plastic strips in a laminar structure through the pressing elements.

18. The device as claimed in claim 14 wherein the pressing elements are arranged such that they can be moved in the direction of the conveying path against a restoring force which acts toward their initial position.

19. The device as claimed in claim 18 wherein the successive pressing elements are arranged on a straight longitudinal support, wherein the support is supported at both ends and has predetermined bending points between respective pairs of successive pressing elements, and wherein the predetermined bending points are formed by slits which extend in the direction of a supporting surface of the longitudinal support and beneath which the longitudinal support resiliently rests such that sagging or upward bending of the support is achieved.

* * * * *